(12) United States Patent
van Bemmel

(10) Patent No.: US 8,019,995 B2
(45) Date of Patent: Sep. 13, 2011

(54) METHOD AND APPARATUS FOR PREVENTING INTERNET PHISHING ATTACKS

(75) Inventor: Jeroen van Bemmel, Leiden (NL)

(73) Assignee: Alcatel Lucent, Paris (FR)

( * ) Notice: Subject to any disclaimer, the term of this patent is extended or adjusted under 35 U.S.C. 154(b) by 1087 days.

(21) Appl. No.: 11/769,479

(22) Filed: Jun. 27, 2007

(65) Prior Publication Data

US 2009/0006861 A1   Jan. 1, 2009

(51) Int. Cl.
*H04L 9/32* (2006.01)
(52) U.S. Cl. .................................................. 713/168
(58) Field of Classification Search ................... None
See application file for complete search history.

(56) References Cited

U.S. PATENT DOCUMENTS 7,617,125 B1* 11/2009 Light et al. ................ 705/26
2006/0230265 A1* 10/2006 Krishna ..................... 713/158

OTHER PUBLICATIONS

Anti-Phishing Working Group: Vendor Solutions, http://www.antiphishing.org/solutions.html, Jun. 15, 2006.
Mozilla Wiki, Phishing Protection: Design Documentation, http://wiki.mozilla.org/Safe_Browsing:_Design_Documentation, Jun. 15, 2006.
Nitesh Dhanjani, "Two Things That Bother Me About Google's New Firefox Extension", http://www.oreillynet.com/pub/wig/8760, Dec. 15, 2005.
"Zero-Footprint Solution to Combat Phising", TriCipher, Inc., San Mateo, CA, Sep. 2005.

* cited by examiner

*Primary Examiner* — Brandon S Hoffman
(74) *Attorney, Agent, or Firm* — Wall & Tong, LLP

(57) ABSTRACT

The invention provides secure access to a web page using a personal pass-phrase to prevent phishing attacks. Upon requesting a web page from a user device, a determination is made as to whether or not an encrypted cookie exists for the requested web page. An encrypted cookie includes the personal pass-phrase and at least one of an identifier of the user device, an identifier of a web browser from which the web page request is initiated, and information about the network path used to establish the personal pass-phrase. If an encrypted cookie does not exist, the user is provided a capability to create the encrypted cookie including a personal pass-phrase. If the encrypted cookie exists, the user device provides the encrypted cookie with the web page request for use by the web server to validate the web page request using information included in the encrypted cookie. If the web page request is valid, the web server propagates the web page toward the user device, otherwise the user device receives an indication that the web server is invalid.

22 Claims, 6 Drawing Sheets

100

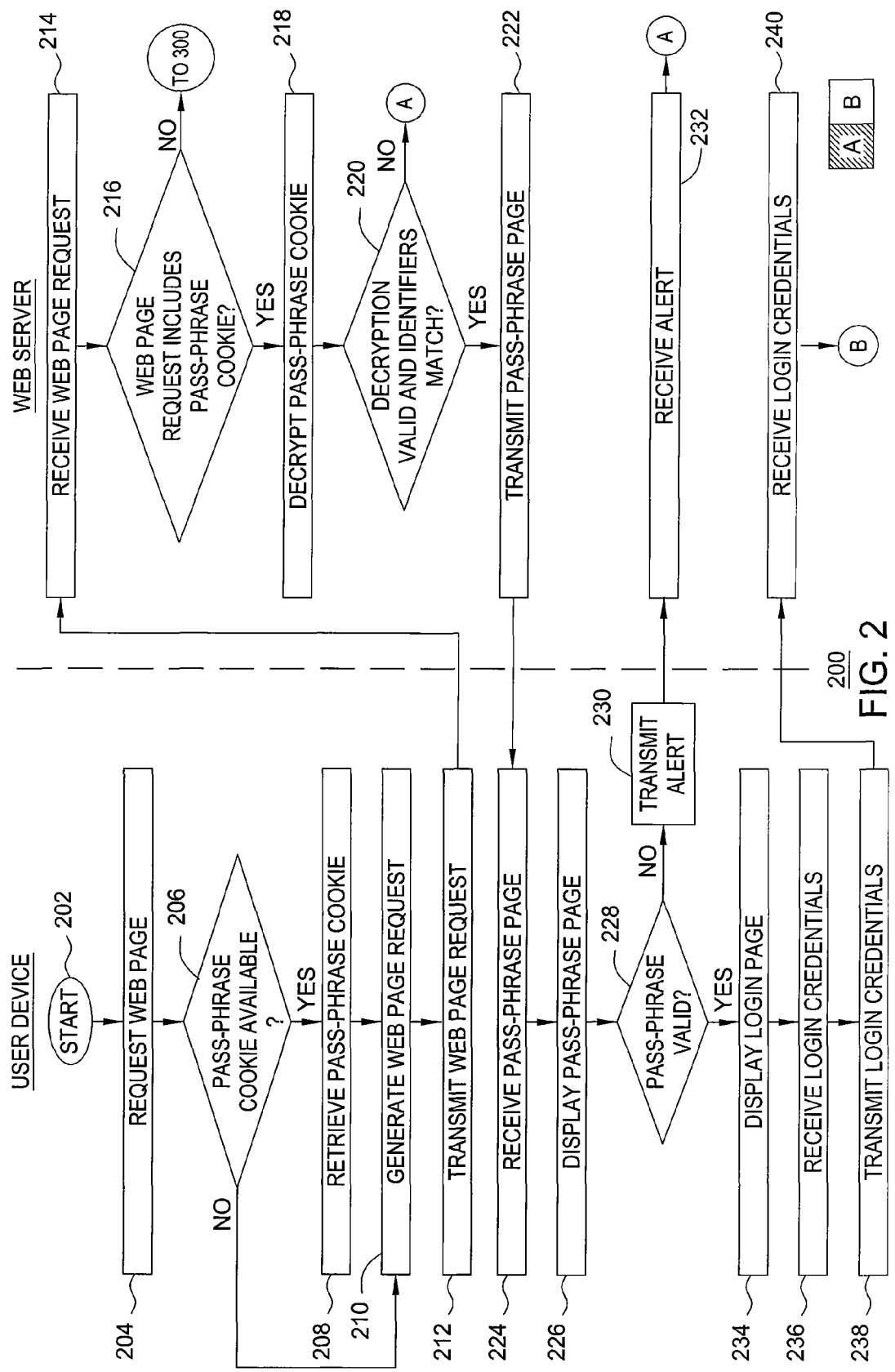

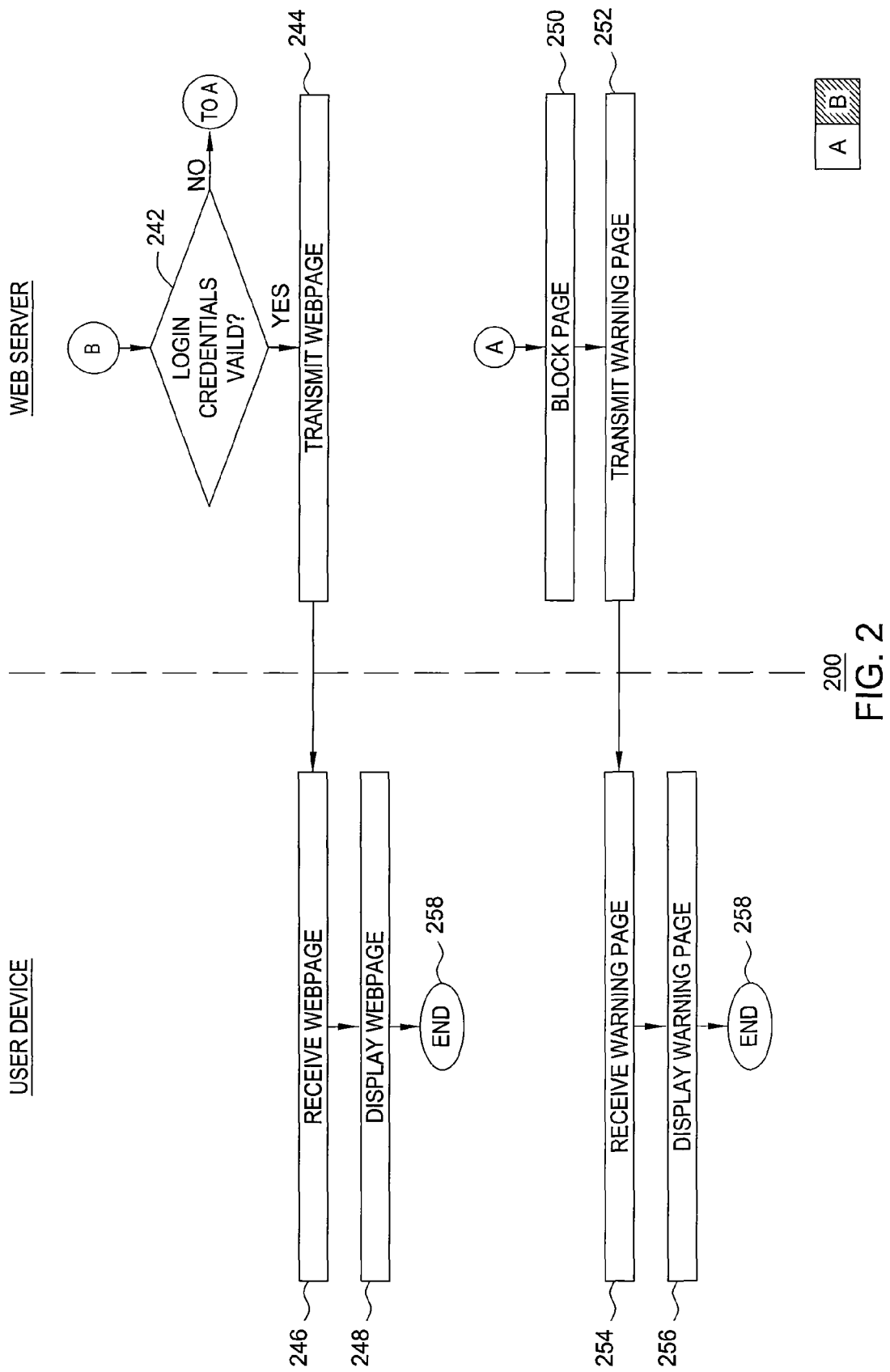

METHOD AND APPARATUS FOR PREVENTING INTERNET PHISHING ATTACKS

FIELD OF THE INVENTION

The invention relates to the field of communication networks and, more specifically, to preventing phishing attacks.

BACKGROUND OF THE INVENTION

As Internet usage increases, Internet-based crime is blooming. One prevalent crime is "phishing", which is an attempt to trick an Internet user into providing personal information to the phishing attacker. The information typically sought by phishing attackers is Internet user login information (e.g., the login name and password for an Internet user) and, sometimes, other information such as credit card information. The phishing attackers use the obtained Internet user information in order to steal the identity of the Internet user. For example, a phishing attack may be used in order to obtain information to impersonate the Internet user (e.g., to log into e-mail accounts, to authorize credit card transactions, and to perform similar actions in the name of the Internet user).

Phishing attackers may use various different setups to launch phishing attacks. For example, a phishing attacker may use Domain Name Service (DNS) spoofing to direct users to a website owned by the attacker when the users enter a Uniform Resource Locator (URL) of a real website. The spoofed website owned by the attacker is often a good look-alike, not exactly the same as the real website, but sufficiently convincing to not alert the user. Sometime, the spoofed website may even connect to the real website in the back-end, acting as a pass-through to the real website. Furthermore, phishing attackers may register a domain name that closely resembles a well-known domain name (e.g., registering www.googel.com instead of www.google.com to attack users that mistype the real domain name).

Many attempts have been made to prevent phishing attacks. Websites supporting user login capabilities often use Hypertext Transfer Protocol-Secure (HTTPS), and may present a certificate to enable the user to validate the identity of the website. Furthermore, many Internet browsers provide a graphical indication of the security level of a website (e.g., displaying an icon representing a padlock if the website displayed in the Internet browser is secure). Other attempts to prevent phishing attacks use cookies to store encrypted keys that servers can use to recognize valid clients; however, the reverse case (i.e., clients recognizing a valid server) is not covered.

Furthermore, other existing attempts to prevent phishing attacks use client-side browser extensions to check for typical signs of phishing (e.g., checking website URLs and checking the syntax of presented website pages). Another common attempt to prevent phishing attacks includes use of blacklists (e.g., lists of phishing webpages maintained locally on a client or remotely on a server which clients may access for each URL requested by the Internet browser). Another more recent attempt to prevent phishing attacks uses two-factor authentication, putting a second factor encrypted in a cookie on the client. In this attempt, the server securely stores a personalized message configured by the user, and the personalized message is displayed to the user before login, thereby enabling the user to distinguish between a valid website and a fraudulent website.

Disadvantageously, despite these attempts to prevent phishing attacks, users are still easily tricked by phishing attacks. For example, users fail to check the validity of a website, fail to notice the absence of icons indicating that a website is secure, and cannot tell the difference between a valid certificate and an invalid certificate. Furthermore, as new attempts to prevent phishing attacks are developed and implemented, phishing attackers may adapt phishing techniques such that users continue to be tricked into providing personal information to the phishing attackers. Therefore, there is clearly a need for an improved technique for preventing phishing attacks.

SUMMARY OF THE INVENTION

Various deficiencies in the prior art are addressed through the invention of a method and apparatus for providing secure access to a web page using a personal pass-phrase to prevent phishing attacks. Upon requesting a web page from a user device, a determination is made as to whether or not an encrypted cookie exists for the requested web page. An encrypted cookie includes the personal pass-phrase and at least one of: an identifier of the user device, an identifier of a web browser from which the web page request is initiated, and information about the network path used to establish the personal pass-phrase. If an encrypted cookie does not exist, the user is provided a capability to create the encrypted cookie including a personal pass-phrase. If the encrypted cookie exists, the user device provides the encrypted cookie with the web page request for use by the web server to validate the web page request using information included in the encrypted cookie. If the web page request is valid, the web server propagates the web page toward the user device, otherwise the user device receives an indication that the web server is invalid.

BRIEF DESCRIPTION OF THE DRAWINGS

The teachings of the present invention can be readily understood by considering the following detailed description in conjunction with the accompanying drawings, in which:

FIG. 2 depicts a method according to one embodiment of the present invention;

To facilitate understanding, identical reference numerals have been used, where possible, to designate identical elements that are common to the figures.

DETAILED DESCRIPTION OF THE INVENTION

The present invention enables users to create a personal pass-phrase and to use the personal pass-phrase to detect phishing attacks before entering login information. Upon requesting a web page, a user is directed to the web server hosting the requested web page (i.e., the login page) in a secure manner (e.g., in a manner that prevents eavesdropping, enables web server verification (e.g., using a server certificate), and the like). The user device provides an encrypted cookie including the pass-phrase to the web server, which decrypts the cookie, verifies that the information included in the encrypted cookie matches information associated with the web page request, and, if the information included in the encrypted cookie matches information associated with the web page request, presents the pass-phrase to the user.

Since encrypted cookie validation and pass-phrase presentation occurs prior to the user entering login information, the pass-phrase enables the user to distinguish real login web pages from spoofed login web pages (since such spoofed web pages would not be able to decrypt the encrypted pass-phrase cookie and present the pass-phrase to the user. Furthermore, use of a pass-phrase, including displaying the pass-phrase and allowing the user to review and approve the displayed pass-phrase provides a user-friendly way for users to distinguish real login web pages from spoofed login web pages. As such, the present invention provides a more secure, user-friendly technique by which users may prevent phishing attacks while using the Internet.

Figure 1:
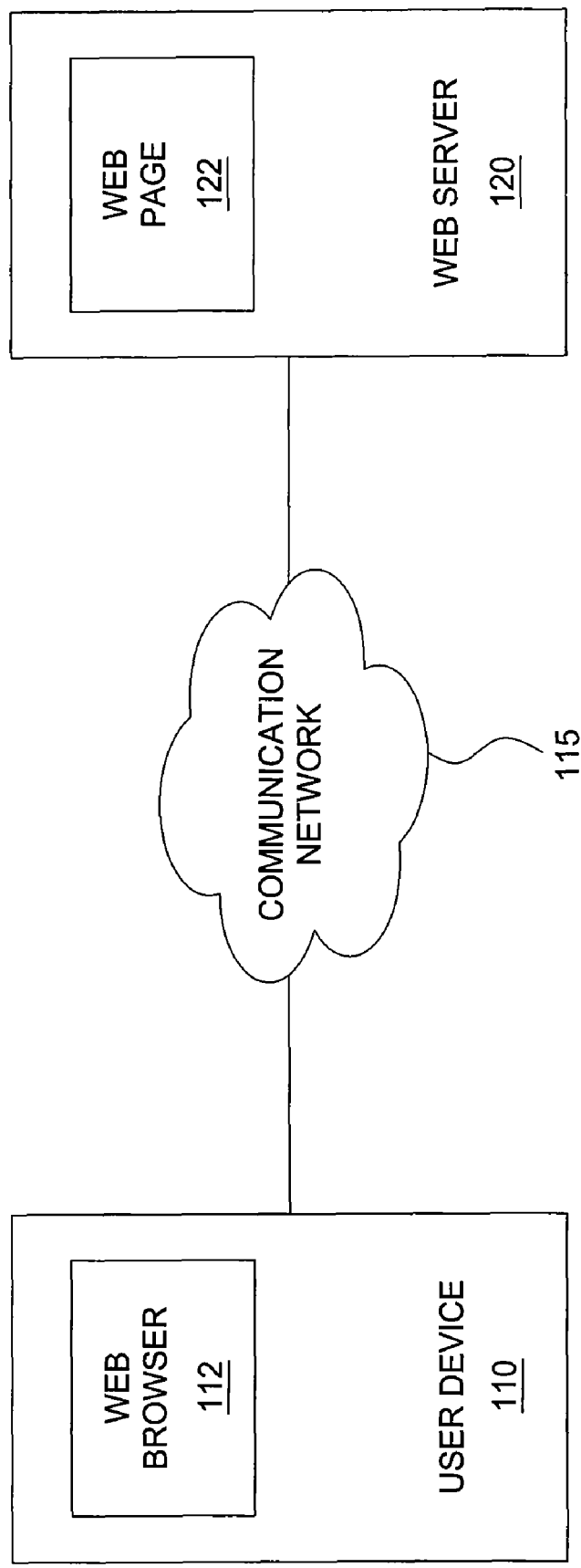
FIG. 1 depicts a high-level block diagram of a communication network.

FIG. 1 depicts a high-level block diagram of a communication system. Specifically, communication system 100 of FIG. 1 includes a user device 110 and a web server 120 in communication via a communication network 115. As depicted in FIG. 1, user device 110 includes a web browser 112 and web server 120 hosts a web page 122. A user associated with user device 110 uses web browser 112 to request web page 122 from web server 120. The communication network 115 may be any communication network (or combination of communication networks) supporting communications between user device 110 and web server 120.

The user device 110 includes any device adapted for requesting web pages and displaying web pages. For example, user device 110 may include a desktop computer, a laptop computer, a mobile phone, a personal digital assistant, and the like, as well as various combinations thereof. The web browser 112 includes any browser adapted for requesting and displaying web pages. For example, web browser 112 may include at least one of Microsoft INTERNET EXPLORER, Netscape NAVIGATOR, Mozilla FIREFOX, and the like, as well as various combinations thereof. The user device 110 is adapted for storing encrypted cookies for the pass-phrase of the present invention. The operation of user device 110 and web browser 112 in performing various functions of the present invention may be better understood with respect to FIG. 2 and FIG. 3.

The web server 120 includes any device adapted for hosting web pages and responding to requests for web pages. The web server 120 includes authentication capabilities (including device authentication, pass-phrase authentication, login authentication, and the like, as well as various combinations thereof). The web server 120 is adapted for generating encrypted cookies for the pass-phrase of the present invention. The web server 120 is adapted for receiving web page requests and comparing information associated with the web page request with information included within an encrypted cookie provided with the web page request. The operation of web server 120 in performing various functions of the present invention may be better understood with respect to FIG. 2 and FIG. 3.

Figure 4:
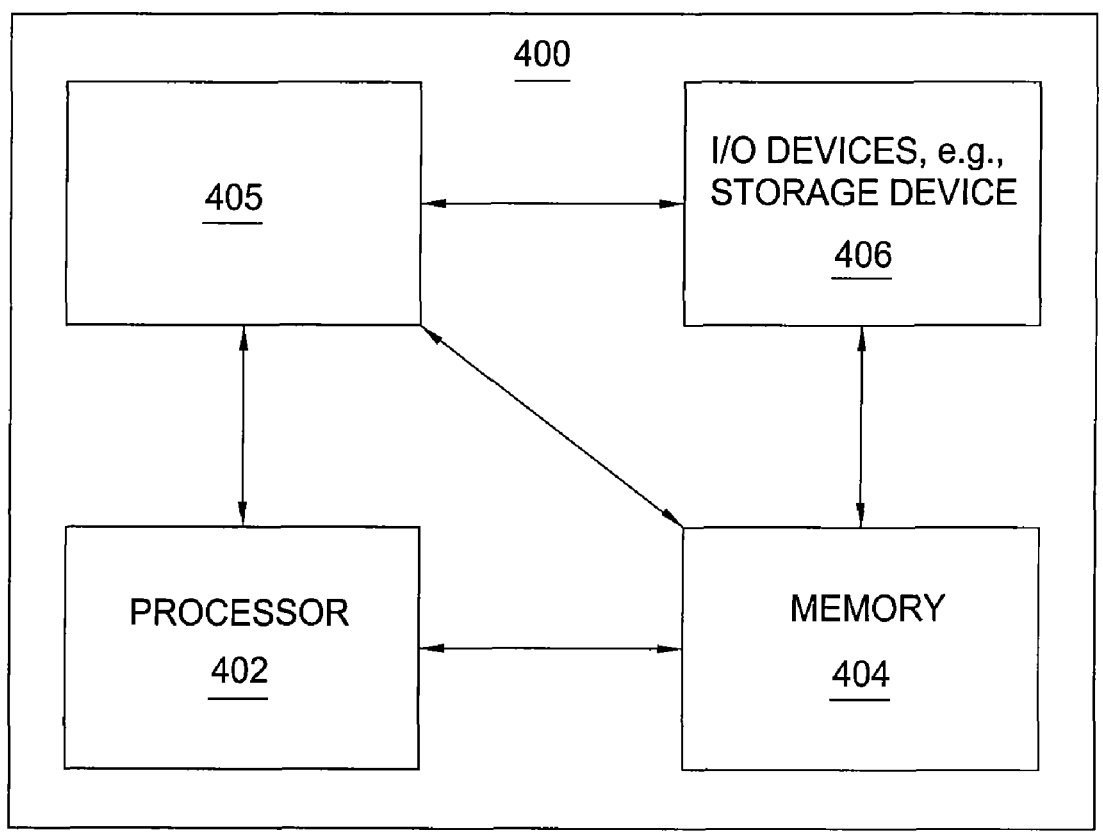
FIG. 4 depicts a high-level block diagram of a general-purpose computer suitable for use in performing the functions described herein.

Although omitted for purposes of clarity, those skilled in the art will appreciate that, in addition to web browser 112, user device 110 includes various other components adapted for requesting, receiving, displaying, and interacting with web pages (e.g., processors, memory, network interface modules, input/output modules, and the like, as well as various combinations thereof, e.g., as depicted and described in FIG. 4). Similarly, although omitted for purposes of clarity those skilled in the art will appreciate that, in addition to web page 122, web server 120 includes other components adapted for responding to web page requests, generating and encrypting pass-phrase cookies, and performing other functions of the present invention (e.g., processors, memory, network interface modules, and the like, as well as various combinations thereof, e.g., as depicted and described in FIG. 4).

FIG. 2 depicts a method according to one embodiment of the present invention. Specifically, method 200 of FIG. 2 includes a method for preventing a phishing attack on a subsequent attempt by a user to access a web page (i.e., after the user has already created a pass-phrase for the web page and the pass-phrase cookie for that web page has been created by the web server and stored on the user device). Although depicted and described as being performed serially, at least a portion of the steps of method 200 of FIG. 2 may be performed contemporaneously, or in a different order than depicted and described with respect to FIG. 2. The method 200 begins at step 202 and proceeds to step 204.

At step 204, a user requests a web page using a user device. The user may request the web page by typing the domain name of the web page in an address bar of the web browser. The user may request the web page by clicking a hyperlink (e.g., from another web page, from an e-mail program, and the like). The user may request the web page using in any other manner for requesting a web page. The web page request is associated with a browser of the user device (e.g., the web page request is initiated using an address bar of an active web browser, the web page request launches a web browser of the user device, and the like).

At step 206, the user device determines whether a pass-phrase cookie is available for the requested web page. In one embodiment, the user device determines whether the pass-phrase cookie is available at the user device includes searching for the pass-phrase cookie in a memory of the user device using an identifier of the requested web page (e.g., using the URL of the web page). The pass-phrase cookie includes the pass-phrase associated with the requested web page and information adapted for use by the web server in validating the web page request (e.g., a user device identifier, a web browser identifier, information about the network path used to establish the personal pass-phrase, and the like, as well as various combinations thereof).

If the pass-phrase cookie is not available for the requested web page, method 200 proceeds to step 210, at which point the user device generates the web page request without including a pass-phrase cookie. If the pass-phrase cookie is available for the requested web page, method 200 proceeds to step 208, at which point the user device retrieves the pass-phrase cookie associated with the requested web page, and proceeds to 210, at which point the user device generates the web page request including the retrieved pass-phrase cookie.

At step 212, the user device transmits a web page request to the web server which hosts the requested web page. The web page request includes one or more identifiers associated with the request for the web page. In one embodiment, the web page request includes a device identifier associated with the user device from which the web page request is initiated. In one embodiment, the web page request includes a browser identifier (and, optionally, other browser information) associated with the web browser from which the web page request is initiated. The web page request may include other identifiers or information. In one embodiment, the user device transmits the web page request using Hypertext Transfer Protocol (HTTP).

At step 214, the web server which hosts the requested web page receives the web page request from the user device. At step 216, the web server determines whether the received web page request includes a pass-phrase cookie. If the web page request does not include a pass-phrase cookie, the user is re-directed to a first-time user web page from which the user can establish a pass-phrase for the requested web page, as depicted and described in FIG. 3. If the web page request does include a pass-phrase cookie, method 200 proceeds to step 218.

At step 218, the web server decrypts the pass-phrase cookie. In one embodiment, in which the pass-phrase cookie is encrypted (by the web server during creation of the pass-phrase, as depicted and described in FIG. 3) using a public key of the certificate associated with the requested web page, the pass-phrase cookie is decrypted using the associated private key (which only the valid login web page knows). The pass-phrase cookie includes the pass-phrase. The pass-phrase may include additional information adapted for increasing security associated with pass-phrase cookie validation.

In one embodiment, the pass-phrase cookie includes information associated with the user device from which the web page request is received. For example, the pass-phrase cookie may include the user device identifier of the user device from which the web-page request is received. In one embodiment, the pass-phrase cookie includes web browser information associated with the web browser from which the web page request is received. For example, the web browser information may include web browser type (e.g., Microsoft INTERNET EXPLORER, Netscape NAVIGATOR, and the like), web browser version (e.g., version 4.1; version 2, service-pack 3A; and the like), and the like, as well as various combinations thereof.

In one embodiment, the pass-phrase cookie is associated with the requested web page. The pass-phrase cookie may include information associated with the requested web page (e.g., the domain name of the requested web-page. The pass-phrase cookie may include information associated with the web server hosting the requested web page (e.g., an identifier of the web server, an address (e.g., IP address) of the web server, and the like, as well as various combinations thereof. The pass-phrase cookie may include other information associated with the requested web page (e.g., information associated with the type of content available from the requested web page).

In one embodiment, the pass-phrase cookie is associated with the network path used to establish the personal pass-phrase. The pass-phrase cookie may include information associated with network path that was used to establish the personal pass-phrase. For example, network path information included in the pass-phrase cookie may include the last hop node from which the HTTP request was received. This information may be useful to detect a man-in-the-middle attack (at the expense of limiting the freedom of movement of the user, because an embodiment using network path information for pass-phrase cookie validation would require the user to perform a new registration operation for each different computer from which the user would like to access the web site).

At step 220, the web server determines whether the decryption of the pass-phrase cookie is valid and, further, determines whether identifiers match (or, more generally, where network path information is used, if information in general is consistent). In one embodiment, the determination as to whether the identifiers match is a determination as to whether one or more identifiers included within the web page request matches one or more corresponding identifiers included within the pass-phrase cookie. The identifier(s) included within the web page request includes an identifier(s) associated with the current web page request. The identifier(s) included within the pass-phrase cookie includes an identifier(s) associated with the first web page request (i.e., the identifier(s) associated with the request for the web page during which the personal pass-phrase was created).

As described herein, the identifiers included within the pass-phrase cookie and the web page request that are compared may include one or more of user device identifiers, web browser identifiers, and the like, as well as various combinations thereof. In one embodiment, in which network path information (e.g., information associated with the network path that was used to establish the personal pass-phrase) is included within the pass-phrase cookie and the web page request, the web server may also compare the network path information of the pass-phrase cookie and the network path information of the web page request to determine whether the information matches. The network path information may be compared in addition to comparisons of user device identifiers and/or web browser identifiers. Less or more information may be compared.

For example, where the web page request includes a user device identifier and web browser identifier (i.e., the user device and web browser identifiers associated with the user device and web browser from which the current web page request was initiated) and the pass-phrase cookie includes a user device identifier and web browser identifier (i.e., the user device and the web browser identifiers associated with the user device and web browser from which the pass-phrase was created), the web server compares the user device identifier and web browser identifier from the web page request to the user device identifier and web browser identifier from the pass-phrase cookie to validate that the identifiers match. As described herein, this is merely one example of information which may be compared (i.e., the pass-phrase cookie and web page request may each include less or more information which must be compared by the web server for validation purposes).

As depicted in FIG. 2, if either the decryption is not valid or the identifiers do not match, method 200 proceeds to step 250, at which point the web server blocks the attempt to access the web page. If the decryption is valid and the identifiers (all identifiers compared, where multiple different identifiers are compared) do match, method 200 proceeds to step 222. At step 222, the web server transmits the pass-phrase page to the user device. At step 224, the user device receives the pass-phrase page from the web server. At step 226, the user device displays the pass-phrase page. The pass-phrase page is displayed in the web browser of the user device. The pass-phrase page includes the pass-phrase created by the user for the requested web page.

At step 228, a determination is made as to whether the pass-phrase (of the pass-phrase page) is valid. In one embodiment, the determination as to whether the pass-phrase displayed in the pass-phrase page is valid is a determination as to whether the pass-phrase displayed in the pass-phrase page matches the pass-phrase created by the user for the requested web page. In one embodiment, the determination as to whether the pass-phrase is valid is performed manually by the user (i.e., the user views the pass-phrase displayed in the pass-phrase page and determines whether the pass-phrase is valid for the requested web page). In one embodiment, the determination as to whether the pass-phrase is valid is performed automatically by the user device (e.g., upon displaying the pass-phrase page, the user device accesses a file storing associations of pass-phrases to corresponding web pages which the user device may use to determine whether the pass-phrase displayed in the pass-phrase page is valid).

As depicted in FIG. 2, if the pass-phrase is not valid, method 200 proceeds to step 230. At step 230, the user device transmits an alert to the web server. In one embodiment, the alert is initiated by the user using the web browser. For example, the pass-phrase page may include a means by which the user may indicate whether the pass-phrase provided in the pass-phrase page is valid, such as a hyperlink, a radio button and selection button, and the like, as well as various combinations thereof. At step 232, the web server receives the alert from the user device. The alert is adapted to inform the web server that the pass-phrase provided in the pass-phrase page (i.e., the pass-phrase included in the pass-phrase cookie received by the web server) is invalid. From step 232, method 200 method 200 proceeds to step 250, at which point the web server blocks the attempt to access the web page (i.e., the login page (which is the requested web page, or a gateway to the requested web page) is not displayed on the user device).

As depicted in FIG. 2, if the pass-phrase is valid, method 200 proceeds to step 234. At step 234, the user device displays a login page (which may be the requested page, a gateway to the requested page, and the like). In other words, although depicted and described herein as a separate web page that is different than the requested web page, in one embodiment, the requested web page may be the login page. In one such embodiment, in which the login page is the requested web page, steps 244-248 depicted and described herein may be omitted, or may be performed in response to a request from the user device for another web page after the user has successfully logged into the website.

Although omitted for purposes of clarity, display of the login page following validation of the pass-phrase may require one or more additional transactions between the user device and the web server. For example, the pass-phrase page may include a means by which an associated user may indicate whether the pass-phrase provided in the pass-phrase page is valid, in which case, in response to an indication that the pass-phrase is valid, the user device may transmit an acknowledgment to the web server indicating that the pass-phrase is valid, thereby triggering the web server to transmit the login page to the user device for display on the user device. For example, the pass-phrase page may be implemented as a pop-up window or a separate web page providing the user with options to indicate whether the pass-phrase is valid or invalid.

Although primarily depicted and described herein with respect to an embodiment in which the pass-phrase page and login page are separate pages (e.g., the pass-phrase page is displayed as a separate web page or pop-up window which must be acknowledged before the login page is provided to the user device), in one embodiment, the pass-phrase may be displayed contemporaneously with display of the login page, or even as part of the login page. In one example, the pass-phrase may be displayed as a pop-up window that overlays the login page so that the user can indicate whether the pass-phrase is valid before accessing the login page. In another example, the pass-phrase may be displayed as part of the login page so that the user can review the pass-phrase before entering and submitting personal login information via the login page.

At step 236, the user device receives login credentials. The user device receives the login credentials via the login page displayed in the web browser. For example, the user enters a login and password into corresponding fields of the login page and triggers transmission of the login credentials to the web server for validation (e.g., presses an ENTER button using the keyboard, clicks an OK button using the mouse, and the like). At step 238, the user device transmits the login credentials to the web server. In one embodiment, the user device transmits the login credentials to the web server using a secure communication protocol, such as Hypertext Transfer Protocol-Secure (HTTPS). At step 240, the web server receives the login credentials from the user device.

At step 242, the web server determines whether the login credentials are valid. The web server may determine whether the login credentials are valid using any suitable method for determining whether the login credentials are valid. In one embodiment, the web server may query a local database in order to determine whether the login and password provided as the login credentials are valid. In one embodiment, the web server may query a remote database (e.g., an AAA server or other authentication device) in order to determine whether the login and password provided as the login credentials are valid. In one embodiment, the web server may use at least a portion of the pass-phrase cookie in order to determine whether the login credentials are valid (e.g., where the pass-phrase cookie includes the user login and/or user password for the requested web page).

As depicted in FIG. 2, if the login credentials are not valid, method 200 proceeds to step 250, at which point the web server blocks the attempt to access the web page (i.e., the requested web page is not displayed on the user device). If the login credentials are valid, method 200 proceeds step 244. At step 244, the web server transmits the requested web page to the user device. At step 246, the user device receives the requested web page from the web server. At step 248, the user device displays the requested web page. The user device displays the requested web page using the web browser. From step 248, method 200 proceeds to step 258, where method 200 ends.

As described herein, if any of the validations performed by the web server fails, method 200 proceeds to step 250, at which point the web server blocks the attempt to access the web page. At step 250, the web server blocks the page (illustratively, the pass-phrase page if the validation of the pass-phrase cookie fails, the login page if the validation of the pass-phrase fails, or the requested web page if the validation of the login credentials fails). At step 252, the web server transmits a warning page to the user device. At step 254, the user device receives the warning page from the web server. At step 256, the user device displays the warning page. In one embodiment, the content of the warning page may depend on the point in the process at which the web server blocks the attempt to access the requested web page. From step 256, method 200 proceeds to step 258, where method 200 ends.

Figure 3:
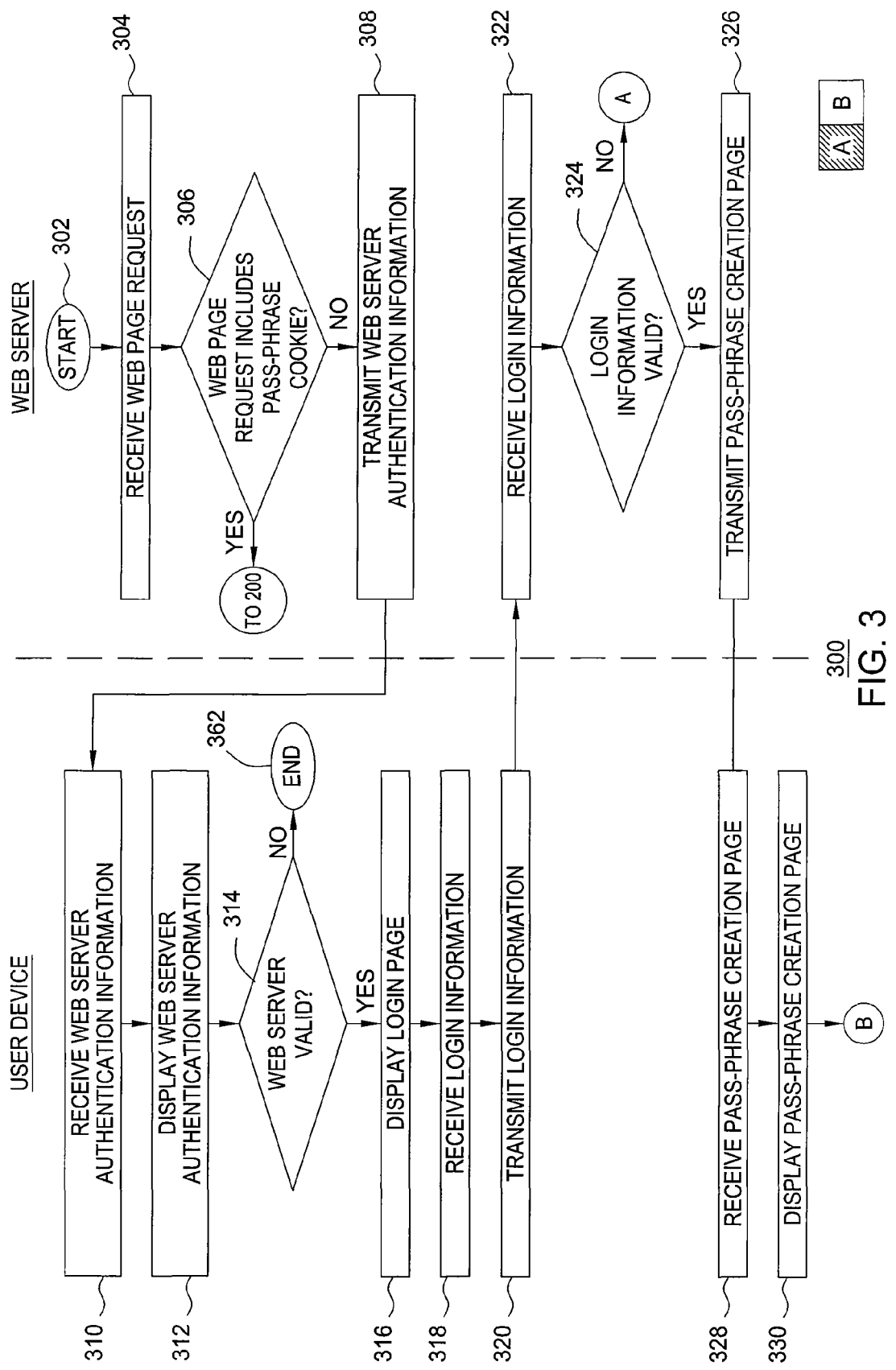
FIG. 3 depicts a method according to one embodiment of the present invention.
Figure 3:
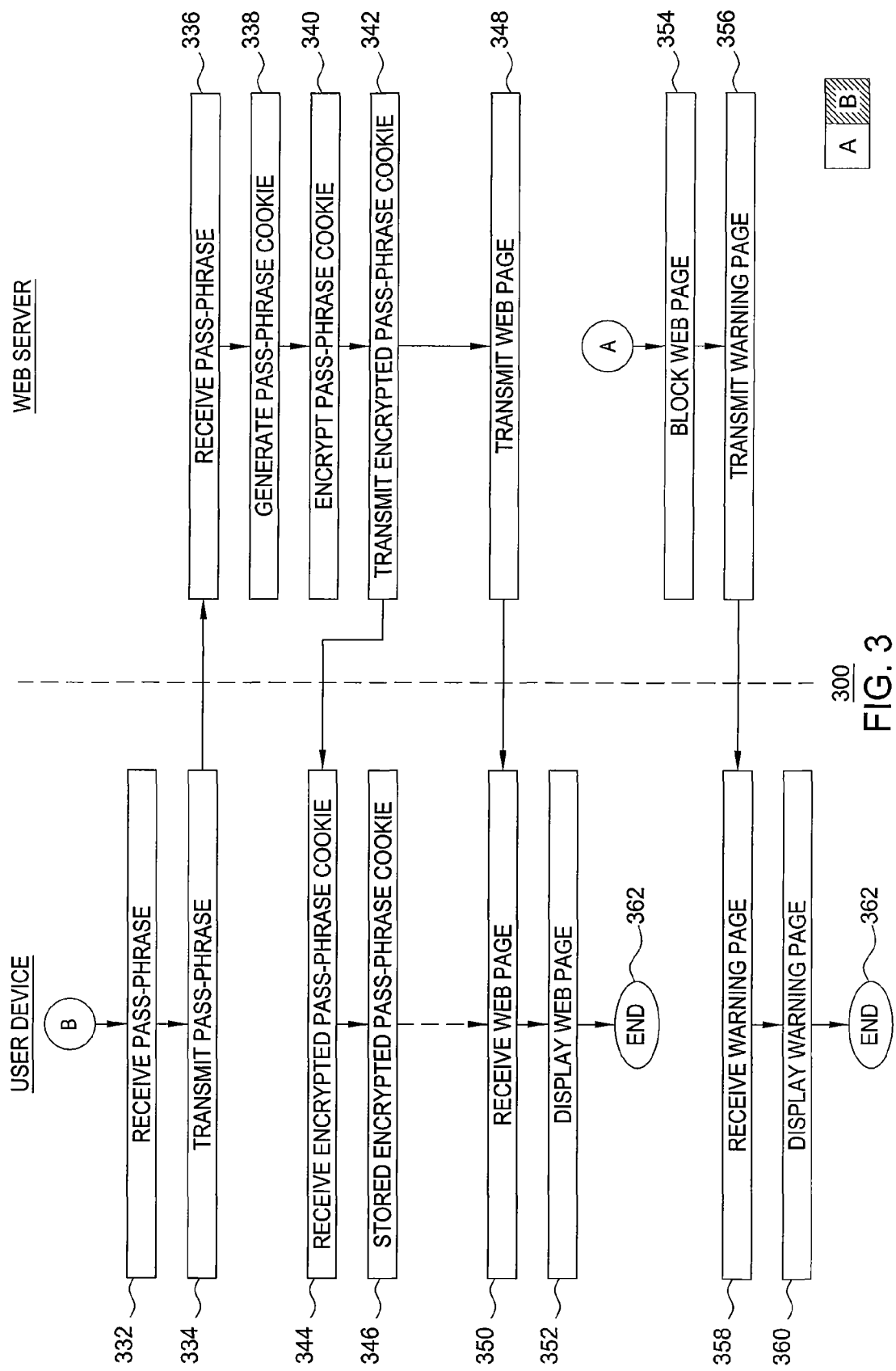

FIG. 3 depicts a method according to one embodiment of the present invention. Specifically, method 300 of FIG. 3 includes a method for preventing a phishing attack on a first attempt by a user to access a web page (i.e., the first time the user is requesting the web page since implementation of the invention, i.e., before the user has created a pass-phrase for the web page and the pass-phrase cookie for that web page has been created by the web server and stored on the user device). Although depicted and described as being performed serially, at least a portion of the steps of method 300 of FIG. 3 may be performed contemporaneously, or in a different order than depicted and described with respect to FIG. 3. The method 300 begins at step 302 (which proceeds from step 216 of method 200 of FIG. 2) and proceeds to step 304.

At step 304, the web server receives a web page request. In one embodiment, in which the user device which transmits the web page request to the web server does not include a pass-phrase cookie with the web page request, the user device may provide, with the web page request, information adapted for use by the web server in creating a pass-phrase cookie (e.g., a user device identifier identifying the user device from which the web page request is initiated, browser information associated with the browser from which the web page request is initiated, and like information, as well as various combinations thereof).

At step 306, the web server determines whether the web page request includes a pass-phrase cookie. If the web-page request includes a pass-phrase cookie, the web server uses the pass-phrase cookie to perform server-side validation of the web page request, and to provide an associated pass-phrase to the user device so that the user can validate the pass-phrase for the requested web page, as depicted and described in FIG. 2. If the web page request does not include a pass-phrase cookie, method 200 proceeds to step 306.

At step 308, the web server transmits web server authentication information to the user device. At step 310, the user device receives the web server authentication information from the web server. At step 312, the user device displays the web server authentication information. The web server authentication information is displayed in the web browser of the user device. The web server authentication information may include any information adapted for use in determining the validity of the web server. In one embodiment, the web server authentication information includes a certificate. In one embodiment, the web server authentication information includes one or more visual indicators (e.g., text, icons, and the like, as well as various combinations thereof).

At step 310, the user device determines whether the web server (i.e., the web server that responds to the web page request) is valid. In one embodiment, the determination as to whether the web server that responds to the web page request is valid is performed automatically by the user device (e.g., using information validation, certification authentication, and the like, as well as various combinations thereof). In one embodiment, the determination as to whether the web server that responds to the web page request is valid is performed manually by the user of the user device.

At step 314, a determination is made as to whether the web server is valid. The determination as to whether the web server is valid is made using the web server authentication information. In one embodiment, the determination as to whether the web server is valid is performed automatically by the user device. In one embodiment, the determination as to whether the web server is valid is performed manually by a user associated with the user device. For example, the user may click a button to accept a displayed certificate, click a button to indicate acceptance of the web server, and the like, as well as various combinations thereof.

As depicted in FIG. 3, if the web server is not valid, method 300 proceeds to step 362 where method 300 ends. In other words, the user device aborts the attempt to access the web page (i.e., the login page (which is the requested web page, or a gateway to the requested web page). If the web server is valid, method 300 proceeds to step 316. At step 316, the login page is displayed. The login page is displayed in the web browser of the user device. The login page may be the requested web page (or a gateway page to the requested web page where the login capability is provided on a page separate from the requested web page).

At step 318, the user device receives login information. In one embodiment, the login information includes a login name and a login password (although other login information may be received, such as security codes, answers to security questions, and the like, as well as various combinations thereof). In one embodiment, the login information is received automatically (e.g., the user device may enter the login information in the login page automatically using one or more cookies stored on the user device). In one embodiment, the login information is received via the displayed login page when a user of the user device manually enters the login information. At step 320, the user device transmits the login information to the web server.

At step 322, the web server receives the login information from the user device. At step 324, the web server determines whether the login information is valid. The web server may determine whether the login credentials are valid using any suitable method for determining whether the login credentials are valid. In one embodiment, the web server may query a local database in order to determine whether the login and password provided as the login credentials are valid. In one embodiment, the web server may query a remote database (e.g., an AAA server or other authentication device) in order to determine whether the login and password provided as the login credentials are valid. In one embodiment, the web server may use at least a portion of the pass-phrase cookie in order to determine whether the login credentials are valid (e.g., where the pass-phrase cookie includes the user login and/or user password for the requested web page).

As depicted in FIG. 3, if the login information is not valid, method 300 proceeds to step 354, at which point the web server blocks the attempt to access the web page (i.e., the requested web page is not displayed on the user device). If the login information is valid, method 300 proceeds step 326. At step 326, the web server transmits a pass-phrase creation page to the user device. At step 328, the user device receives the pass-phrase creation page from the web server.

At step 330, the user device displays the pass-phrase creation page. The user device displays the pass-phrase creation page using the web browser. The pass-phrase creation page may include a statement requesting that the user enter a pass-phrase in a corresponding pass-phrase entry field. The pass-phrase creation page may include one or more suggested pass-phrases, thereby enabling the user to select one of the suggested pass-phrases. The pass-phrase creation page may include a capability to indicate the security level of the pass-phrase as the user enters it (e.g., as the user adds more characters and words to the pass-phrase, the security level of the pass-phrase increases). Although described with respect to specific features of the pass-phrase creation page, pass-phrase creation pages may include various other features and associated formats.

At step 332, the user device receives a pass-phrase. The pass-phrase may include any combination of characters. In one embodiment, the pass-phrase is received via the displayed pass-phrase creation page when a user of the user device manually enters the pass-phrase. At step 334, the user device transmits the pass-phrase to the web server. In one embodiment, the user device may provide, with the pass-phrase transmitted to the web server, information adapted for use by the web server in creating a pass-phrase cookie (e.g., a user device identifier identifying the user device from which the web page request is initiated, browser information associated with the browser from which the web page request is initiated, and like information, as well as various combinations thereof).

At step 336, the web server receives the pass-phrase. At step 338, the web server generates a pass-phrase cookie. The pass-phrase cookie may be generated using any cookie generation process. The pass-phrase cookie includes the pass-phrase. The pass-phrase may include other information adapted for increasing security associated with pass-phrase cookie validation. For example, as described herein with respect to FIG. 2, the pass-phrase cookie may include one or more of user device information associated with the user device from which the web page request is received, web browser information associated with the web browser from which the web page request is received, network path information associated with the network path used to establish the personal pass-phrase, and the like, as well as various combinations thereof.

At step 340, the web server encrypts the pass-phrase cookie. In one embodiment, the pass-phrase cookie is encrypted using a public key of the certificate associated with the requested web page such that the encrypted pass-phrase cookie (when it is received by the web server during subsequent requests for the web page initiated from that user device) can only be decrypted using the associated private key (which only the valid login web page knows). Although primarily described herein with respect to public key encryption, the pass-phrase cookie may be encrypting using various other forms of encryption.

At step 342, the web server transmits the encrypted pass-phrase cookie to the user device. At step 344, the user device receives the encrypted pass-phrase cookie (for use by the user device in subsequent requests for that web page). At step 346, the user device stores the encrypted pass-phrase cookie. From step 346, the user device waits to receive the requested web page from the web server (which the web server may transmit to the user device before or after transmitting the encrypted pass-phrase cookie).

At step 348, the web server transmits the requested web page to the user device. At step 350, the user device receives the requested web page from the web server. At step 352, the user device displays the requested web page. The user device displays the requested web page using the web browser. From step 352, method 300 proceeds to step 362, where method 300 ends.

As described herein, if validation of the login information by the web server fails (i.e., the login information is invalid, as determined at step 324), method 300 proceeds to step 354. At step 354, the web server blocks the page (i.e., the requested web page). At step 356, the web server transmits a warning page to the user device. At step 358, the user device receives the warning page from the web server. At step 360, the user device displays the warning page. The warning page may include any information adapted for informing the user that the attempt to access the web page is blocked, including one or more reasons why the attempt to access the web page is blocked. From step 360, method 300 proceeds to step 362, where method 300 ends.

Although omitted for purposes of clarity, establishment of a personal pass-phrase may be adapted to be performed in a more secure manner. In one embodiment, for example, the personal pas-phrase may be provided to the user using a different communication channel (i.e., different than the communication channel expected to be used to access the web page). For example, the personal pass-phrase may be provided to the user using a text message (e.g., using Short Messaging Service (SMS) message), an email, a phone call, and the like. Furthermore, in an embodiment in which a web link is used, HTTPS may be used for network communications, and, optionally, an IP address may be used in place of the hostname in order to prevent possible spoofing attacks during establishment of the personal pass-phrase.

FIG. 4 depicts a high-level block diagram of a general-purpose computer suitable for use in performing the functions described herein. As depicted in FIG. 4, system 400 comprises a processor element 402 (e.g., a CPU), a memory 404, e.g., random access memory (RAM) and/or read only memory (ROM), a phishing security module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present phishing security process 405 can be loaded into memory 404 and executed by processor 402 to implement the functions as discussed above. As such, phishing security process 405 (including associated data structures) of the present invention can be stored on a computer readable medium or carrier, e.g., RAM memory, magnetic or optical drive or diskette and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for providing secure access to a web site, comprising:
  receiving a request for a web page, the request being initiated from a web browser of a user device, the user device having an associated user device identifier, the web browser having an associated web browser identifier, wherein the request comprises the user device identifier, the web browser identifier, and an encrypted cookie;
  decrypting the encrypted cookie to obtain a pass-phrase associated with the requested web page, a user device identifier, and a web browser identifier; and
  propagating the pass-phrase toward the user device in response to a determination that the user device identifier of the web page request and the user identifier from the decrypted cookie match and the web browser identifier of the web page request and the web browser identifier from the decrypted cookie match.

2. The method of claim 1, further comprising:
  in response to a determination that the encrypted cookie cannot be properly decrypted, blocking the requested web page and propagating a warning page toward the user device.

3. The method of claim 1, further comprising:
  in response to a determination that the user device identifier of the web page request and the user identifier from the decrypted cookie do not match or the web browser identifier of the web page request and the web browser identifier from the decrypted cookie do not match, blocking the requested web page and propagating a warning page toward the user device.

4. The method of claim 1, further comprising:
  receiving login credentials from the user device in response to the pass-phrase being valid for the requested web page; and propagating the requested web page toward the user device in response a determination that the received login credentials are valid.

5. The method of claim 1, further comprising:
receiving an alert from the user device in response to the pass-phrase being invalid for the requested web page.

6. A method, comprising:
receiving a request for a web page, the web page request being received from a web browser of a user device;
propagating, toward the user device, a pass-phrase creation page;
receiving, from the user device, a pass-phrase created using the pass-phrase creation page;
generating a pass-phrase cookie including the created pass-phrase, a user device identifier of the user device, and a web browser identifier of the web browser;
encrypting the generated pass-phrase cookie; and
propagating the encrypted pass-phrase cookie toward the user device.

7. The method of claim 6, wherein propagating the pass-phrase creation page toward the user device comprises:
in response to a determination that the received web page request does not include an encrypted pass-phrase cookie, propagating web server authentication information toward the user device;
receiving, from the user device, login information; and
in response to a determination that the login information is valid, propagating the pass-phrase creation page toward the user device.

8. The method of claim 6, further comprising:
receiving the encrypted pass-phrase cookie at the user device; and
storing the encrypted pass-phrase cookie at the user device, wherein the encrypted pass-phrase cookie is associated with the requested web page.

9. The method of claim 8, further comprising:
in response a subsequent request for the web page initiated from the user device, retrieving the encrypted pass-phrase cookie and transmitting the subsequent web page request including the encrypted cookie toward the web server.

10. A method, comprising:
detecting, at a user device, a request for a web page initiated from a web browser of the user device;
retrieving an encrypted cookie associated with the web page, wherein the encrypted cookie comprises a pass-phrase, a user device identifier of the user device, and a web browser identifier of the web browser;
propagating the web page request toward a web server hosting the requested web page, wherein the web page request includes the encrypted cookie, wherein the web server is adapted for validating the web page request using the encrypted cookie;
receiving, from the web server, a pass-phrase page including the pass-phrase from the encrypted cookie; and
displaying the pass-phrase page including the pass-phrase using the web browser.

11. The method of claim 10, wherein retrieving the encrypted cookie comprises:
determining whether the pass-phrase cookie is available at the user device; and
in response to a determination that the pass-phrase cookie is available at the user device, retrieving the pass-phrase cookie from a memory of the user device.

12. The method of claim 11, wherein determining whether the pass-phrase cookie is available at the user device comprises:
searching for the pass-phrase cookie using an identifier of the requested web page.

13. The method of claim 10, further comprising:
in response to a determination that the pass-phrase displayed in the pass-phrase page is valid, displaying a login page associated with the requested webpage.

14. The method of claim 10, further comprising:
in response to a determination that the pass-phrase displayed in the pass-phrase page is invalid, transmitting an alert toward the web server.

15. A method, comprising:
detecting, at a user device, a request for a web page initiated from a web browser;
in response to a determination that an encrypted pass-phrase cookie associated with the requested web page is not available, transmitting the web page request to a web server;
displaying a pass-phrase creation page received from the web server, the pass-phrase creation page adapted for use in creating a pass-phrase associated with the requested web page;
receiving the pass-phrase associated with the requested web page;
transmitting the pass-phrase toward the web server; and
receiving an encrypted pass-phrase cookie from the web server, wherein the encrypted pass-phrase cookie includes the pass-phrase, a user device identifier of the user device, and a web browser identifier of the web browser; and
storing the encrypted pass-phrase cookie.

16. The method of claim 15, further comprising:
receiving web server authentication information from the web server;
displaying the received web server authentication information; and
in response to an indication that the web server is valid based on the web server authentication information, displaying a login page.

17. The method of claim 16, further comprising:
receiving login information via the displayed login page;
transmitting the login information toward the web server; and
in response to the login information being valid, receiving the pass-phrase creation page from the web server.

18. The method of claim 15, further comprising:
in response to detecting a subsequent request for the web page, retrieving the encrypted pass-phrase cookie and transmitting the subsequent web page request, including the encrypted cookie, toward the web server.

19. An apparatus for providing secure access to a web site, comprising:
a processor configured to:
receive a request for a web page, the request being initiated from a web browser of a user device, the user device having an associated user device identifier, the web browser having an associated web browser identifier, wherein the request comprises the user device identifier, the web browser identifier, and an encrypted cookie;
decrypt the encrypted cookie to obtain a pass-phrase associated with the requested web page, a user device identifier, and a web browser identifier; and
propagate the pass-phrase toward the user device in response to a determination that the user device identifier of the web page request and the user identifier from the decrypted cookie match and the web browser identifier of the web page request and the web browser identifier from the decrypted cookie match.

20. An apparatus, comprising:
a processor configured to:
receive a request for a web page, the web page request being received from a web browser of a user device;
propagate, toward the user device, a pass-phrase creation page;
receive, from the user device, a pass-phrase created using the pass-phrase creation page;
generate a pass-phrase cookie including the created pass-phrase, a user device identifier of the user device, and a web browser identifier of the web browser;
encrypt the generated pass-phrase cookie; and
propagate the encrypted pass-phrase cookie toward the user device.

21. An apparatus, comprising:
a processor configured to:
detect, at a user device, a request for a web page initiated from a web browser of the user device;
retrieve an encrypted cookie associated with the web page, wherein the encrypted cookie comprises a pass-phrase, a user device identifier of the user device, and a web browser identifier of the web browser;
propagate the web page request toward a web server hosting the requested web page, wherein the web page request includes the encrypted cookie, wherein the web server is adapted for validating the web page request using the encrypted cookie;
receive, from the web server, a pass-phrase page including the pass-phrase from the encrypted cookie; and
display the pass-phrase page including the pass-phrase using the web browser.

22. An apparatus, comprising:
a processor configured to:
detect, at a user device, a request for a web page initiated from a web browser;
in response to a determination that an encrypted pass-phrase cookie associated with the requested web page is not available, transmit the web page request to a web server;
display a pass-phrase creation page received from the web server, the pass-phrase creation page adapted for use in creating a pass-phrase associated with the requested web page;
receive the pass-phrase associated with the requested web page;
transmit the pass-phrase toward the web server;
receive an encrypted pass-phrase cookie from the web server, wherein the encrypted pass-phrase cookie includes the pass-phrase, a user device identifier of the user device, and a web browser identifier of the web browser; and
store the encrypted pass-phrase cookie.

* * * * *